United States Patent [19]

Baskin et al.

[11] Patent Number: 5,307,055
[45] Date of Patent: Apr. 26, 1994

[54] DISPLAY CONTROL DEVICE INCORPORATING AN AUXILIARY DISPLAY

[75] Inventors: Herbert B. Baskin, Berkeley; Joseph A. DuVivier; Eugene Sanders, both of Oakland, all of Calif.

[73] Assignee: General Parametrics Corporation, Berkeley, Calif.

[21] Appl. No.: 908,937

[22] Filed: Jul. 6, 1992

Related U.S. Application Data

[63] Continuation of Ser. No. 568,588, Aug. 16, 1990, abandoned.

[51] Int. Cl.$^5$ .............................................. G09G 3/02
[52] U.S. Cl. ................................ 345/1; 340/825.17; 434/350; 348/734
[58] Field of Search ............... 340/717, 706, 825.69, 340/825.72, 825.56, 825.17; 358/194.1, 22; 455/155, 158, 4; 341/17, 23; 364/700, 710, 710.14; 359/164; 434/350, 362, 334, 307

[56] References Cited

U.S. PATENT DOCUMENTS

| | | | |
|---|---|---|---|
| 4,498,098 | 2/1985 | Stell | 358/22 |
| 4,712,105 | 12/1987 | Köhler | 340/825.72 |
| 4,745,402 | 5/1988 | Auerbach | 340/709 |
| 4,857,898 | 8/1989 | Smith | 340/825.69 |
| 4,897,727 | 1/1990 | Richards | 455/151.1 |
| 5,003,396 | 3/1991 | Kang | 359/146 |

*Primary Examiner*—Alvin E. Oberley
*Assistant Examiner*—Chanh Nguyen
*Attorney, Agent, or Firm*—Blakely, Sokoloff, Taylor & Zafman

[57] ABSTRACT

A method for controlling a system for presenting to an audience images on a primary display or displays that incorporates a auxiliary monitor. The auxiliary monitor may be used in a variety of ways to assist in the presentation of information on the primary display. The preferred embodiment of the present invention contains a hand-held display control including an array of key switches providing control of the main monitor and an auxiliary monitor allowing the operator to view any one of several options. These options include a duplicate of the image being displayed on the main monitor, the next image to be displayed on the main monitor, any other image available from the image generator, a list of the images available from the image generator, and notes associated with each image or with the entire presentation.

10 Claims, 8 Drawing Sheets

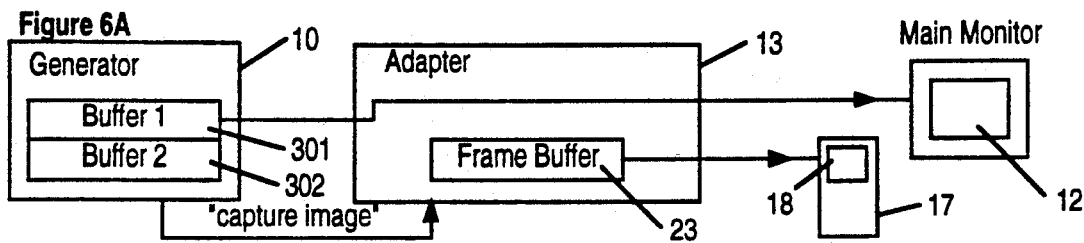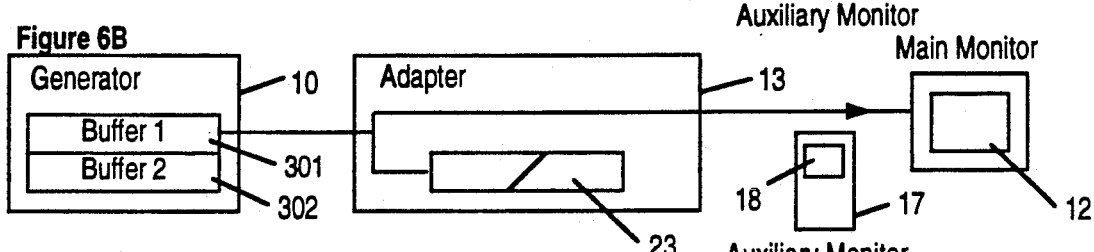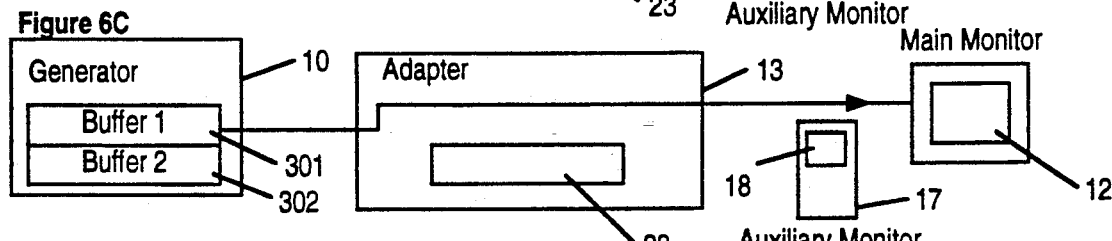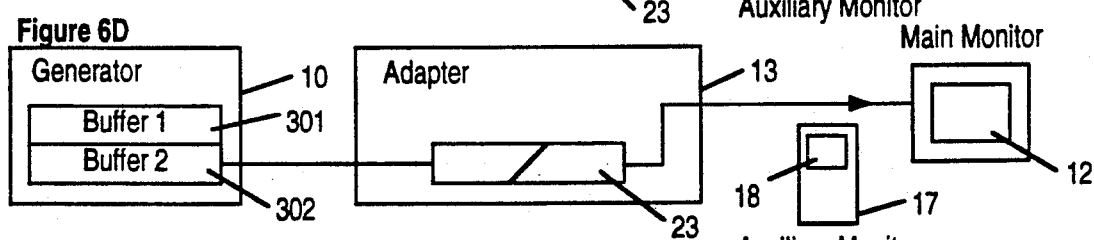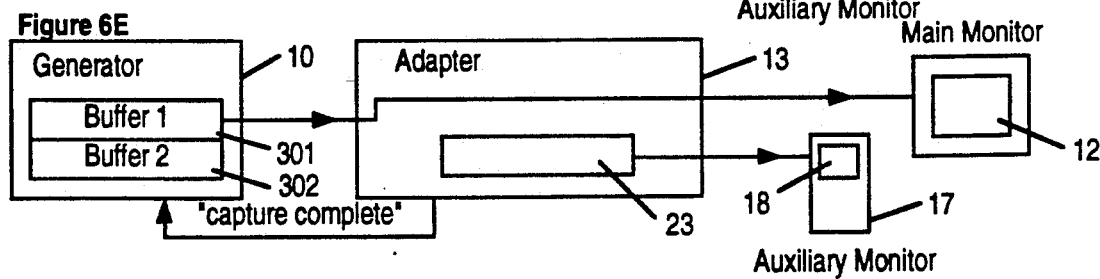

DISPLAY CONTROL DEVICE INCORPORATING AN AUXILIARY DISPLAY

This is a continuation of application Ser. No. 07/568,588, filed Aug. 16, 1990, now abandoned.

BACKGROUND OF THE PRESENT INVENTION

1. Field of the Invention

The present invention relates to display control devices such as remote controls, and, more particularly to display control devices incorporating an auxiliary monitor to provide the operator controlling the main presentation system with private access to slide previews and slide information.

2. Prior Art

Previous display control devices, such as remote controls for slide projectors or computer-generated electronic displays, provide the operator with an array of control functions such as slide number selection, processing direction of slide presentation, etc. The control functions of the prior art controls range from a limited number of fixed controls to a freely programmable remote control. However, these prior art control devices do not provide the operator with the ability to preview an image before it is displayed to the audience. Furthermore, the operator is unable to view other information applicable to the presentation. While such information provides the operator with necessary facts and details concerning a particular slide or sequence of slides, often the information is not suited for audience consumption.

Both of these features, that is, the ability to preview the slide and privately access information from the main system, greatly enhance the utility of a remote control by placing less reliance on the operator's memory. Additionally, the ability to preview and have information on a readable liquid crystal display allows the operator to give a coherent, professional presentation without unnecessary paper shuffling or loss of information.

The present invention provides these desirable features by incorporating an auxiliary monitor within the remote control. This provides the operator with private access to information from the presentation system.

SUMMARY OF THE INVENTION

During the majority of a presentation, the main monitor receives a main output signal from a generator means. While this is occurring, an image is displayed on the hand-held remote control device. This image can be derived from capturing the image from the main output signal, generated from the generator means separately from the main output signal and stored in an auxiliary display memory or a combination of capturing an image as well as generating an overlay image or text.

In the first alternative embodiment, the operator communicates with the generator means via a control adapter device that also controls the main output signal, requesting the generator means to prepare an image for display on the hand-held remote control. The requested image is generated separately from the main output signal. The requested image is written into an auxiliary display memory and then to the auxiliary monitor.

In the second alternative embodiment, the operator's request for an image on the auxiliary monitor triggers a capture sequence. During the majority of a presentation, the main monitor receives a duplicate of the main output signal from the control adapter device. While this is occurring, the image displayed on the remote control device auxiliary monitor is derived either from the main output signal or from an auxiliary display memory. When the operation of the remote control device requires a new image to be displayed on the auxiliary monitor, the following sequence of events occurs:

First, the control adapter device communicates with the generator means via a bi-directional interface separate from the main output signal, causing the generator means to prepare to display the image desired for the auxiliary monitor.

Second, the generator means communicates with the control adapter device that it is ready to switch the contents of the main video signal to the image designated from the auxiliary monitor.

Third, the control adapter device disables, on instructions from a microprocessor device within the control adapter device means, the signal producing the current image on the auxiliary monitor. The current image being displayed on the main monitor is stored in auxiliary display memory as a digital copy. This is accomplished by converting the main output signal to digital information using one or more high-speed analog-to-digital (A/D) converters. Alternately, if generator means is capable of outputting digital signals that represent the contents of the main output signal, the A/D converters and associated low-pass filters can be avoided.

Fourth, the generator means switches the contents of the main video signal so that this signal transmits the image desired to be displayed on the auxiliary monitor. The control adapter device stores this image in its auxiliary display memory. Simultaneously, the previously stored image in the auxiliary display memory, that is, the copy of the image which was being viewed in the main monitor, is sent to the main monitor. This process continues for one field or one frame of display time, according to the capacity of the auxiliary display memory in the control adapter device.

Finally, after the new image has been stored in the auxiliary display memory, the generator means switches the contents of the main output signal back to the prior image being displayed to the audience on the main monitor. The control adapter device simultaneously is switched back to sending a main output signal to the main monitor. Thus, the image on the main monitor has only momentarily been replaced by a copy. The auxiliary display memory then provides the stored image to the auxiliary monitor in hand-held remote control device.

This procedure is designed to minimize the amount of time that the contents of the auxiliary display memory are being viewed by the audience, thus allowing the use of a more economical low-resolution display memory and more cost effective support circuitry. The auxiliary monitor used in the preferred embodiment is typically a small liquid crystal display (LCD) screen, similar to the prior-art screens used in hand held televisions, such as the Sony Video Walkman TM. The auxiliary monitor is generally incorporated in a hand-held remote control device. The auxiliary monitor may also be mounted in a remote location accessible by the operator. However, the small hand-held screen allows the use of the more economical electronics for generating the image to be viewed by the operator.

The preferred embodiment of the present invention is practiced using a combination of the first and second alternative embodiments. The image to be displayed on the auxiliary monitor is captured from the main output signal. The sequence from capturing an image from the main output signal follows the same sequence as summarized in reference to the second alternative embodiment. The text or auxiliary graphics are generated separately from the main output signal and transmitted to the control adapter device and stored in the auxiliary memory device. The text or auxiliary graphics are subsequently combined and displayed on the auxiliary monitor.

While the above-reference sequence illustrates the flow of the present invention, the Detailed Description of the Preferred Embodiment describes the apparatus and practice of the present invention.

BRIEF DESCRIPTION OF THE DRAWINGS

FIGS. 6(a-e) illustrate a sequence of events used to capture an image from a main display to an auxiliary monitor of the present invention as practiced in the preferred embodiment, as well as in the second alternative embodiment as described in FIG. 2.

DETAILED DESCRIPTION OF THE PRESENT INVENTION

An invention is described that provides for a hand-held remote control for use with a presentation system utilizing graphical images inputted into a computer or other graphical generation means. As a result of the present invention, an operator of the presentation system is better prepared and the presentation progresses smoothly due to the ability of the operator to preview the program during the presentation before the next series of displays or slides are presented to the audience. In the following description, numerous specific details are set forth such as specific electronic devices and model numbers, in order to provide a more thorough understanding of the present invention. It will be obvious, however, to one skilled in the art that the present invention may be practiced without the specific details. In other instances, well-known devices have not been described in detail in order not to unnecessarily obscure the present invention.

Figure 1:
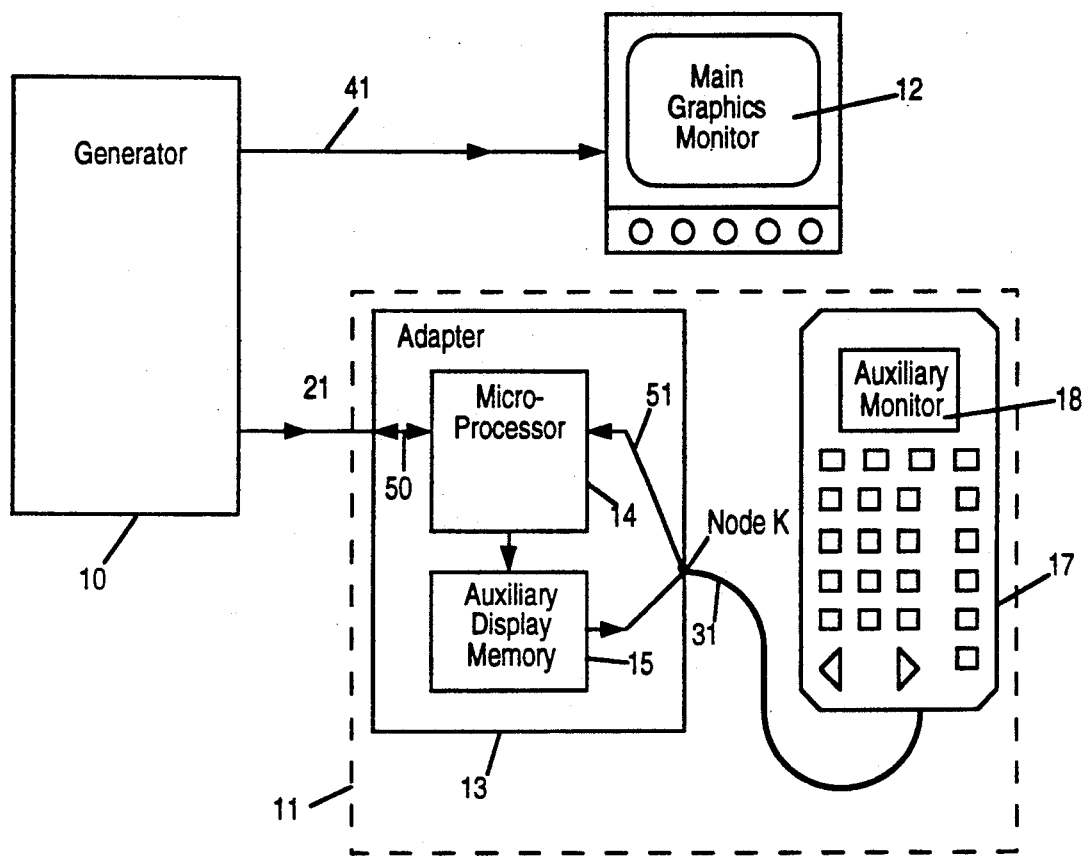
FIG. 1 is a block diagram of the present invention practiced in a first alternative embodiment.

FIG. 1 describes a first alternative embodiment of the present invention. The display control device 11 is used in combination with a graphics generator means 10 (image generation means) and a main monitor 12 (primary display means). The display control device 11 comprises a control adapter device 13, incorporating a microprocessor 14 (display control logic means) and an auxiliary display memory 15 (storage means) and a remote control device 17 (remote control means), incorporating an auxiliary monitor 18 (secondary display means). The remote control device 17 also incorporates an array of pushbutton switches. Other input means such as a trackball can also be used to control the generator means 10 and the images displayed on the main monitor 12, as well as the auxiliary monitor 18.

Figure 7:
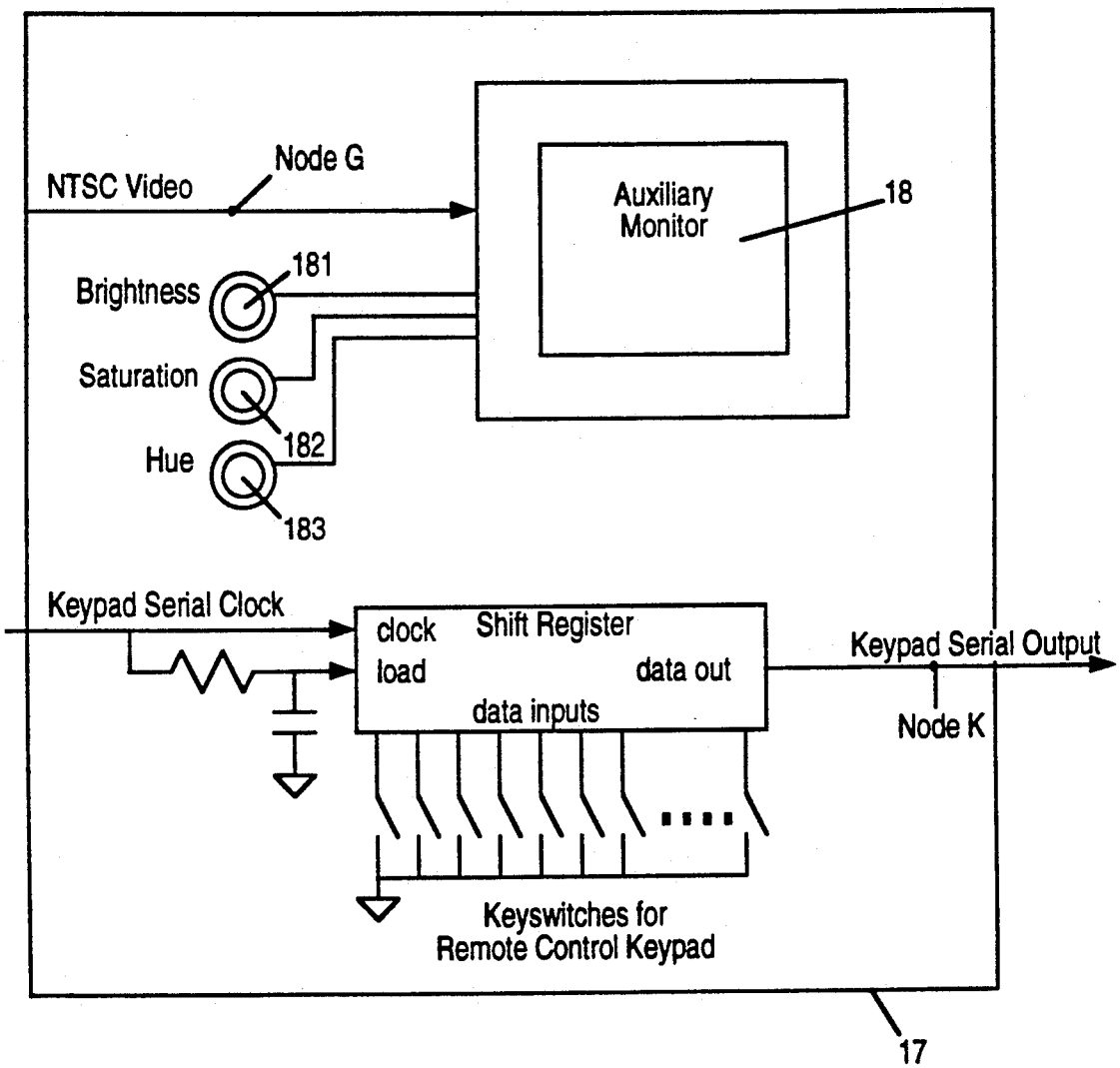
FIG. 7 is a block diagram of a hand-held remote control incorporating an auxiliary monitor of the present invention as practiced in all embodiments.

The auxiliary monitor 18, as illustrated in FIGS. 1 and 7, is typically a small liquid crystal display capable of receiving and displaying an NTSC encoded video signal from the auxiliary display memory 15. The monitor 18 can be adjusted for brightness, color saturation, and hue, using controls 181-183.

The keypad of the remote control device 17 used to practice all the embodiments of the present invention, typically is comprised of keyswitches, a shift register and a keypad serial clock source which derives a clocking signal from an input signal from the control adapter device 13. The keypad serial output signal 51, coupled at Node K, is transmitted to the input of the microprocessor 14. The microprocessor 14 then instructs, via a bi-directional interface 50, the generator means 10 to conform with the instructions entered by the operator on the keypad of the remote control device 17.

Referring again to FIG. 1, the graphics generator means 10 (image generation means) as practiced in the present invention is a computer, but any graphics generator means well-known in the prior art may be used and still be within the spirit and scope of the present invention.

Furthermore, while FIG. 1 illustrates a single monitor as the main monitor 12, it should be realized that multiple monitors or other means of presenting images to an audience may be identified as the main monitor 12. The number of main monitors 12 is dependent on the size of the audience, the size of the monitors, and on the number of images to be simultaneously displayed to the audience.

Additionally, please note that an audience, as defined by the present invention, encompasses any viewer or viewers of a presentation or graphics display who is not the operator of the presentation. An example of an audience is a sales force attending a sales meeting, wherein the operator is defined as the sales or marketing manager. Another example is a group of students, wherein the a teacher is defined as an operator. It should be realized that the above examples are merely illustrative of potentially different categories of audience/operator combinations and in no way limit the audience/operator combinations applicable to the practice of the present invention.

In the first alternative embodiment, as illustrated in FIG. 1, a primary signal 41 of the generator means 10 is coupled to the input of the main monitor 12. In addition, a secondary signal 21 is generated by the generator means 10 and is transmitted to the microprocessor 14 via a bi-directional interface 50. Primary visual images are displayed on the main monitor 12 (primary display means). Secondary visual images are displayed on the auxiliary monitor 18 (secondary display means).

The primary signal 41 could be a red, green and blue (RGB) video signal or a black and white signal or a video signal with encoded color. The secondary signal 21 may be any of several representations of graphical information to be displayed on the auxiliary monitor 18, including a representation in a graphics language, a bit map, or a run length representation. The microprocessor 14 processes the secondary signal 21. The processed signal is sent to auxiliary display memory 15. A secondary output signal 31 is then sent from auxiliary display memory 15 to the auxiliary display 18 through the control device 17.

Figure 8A:
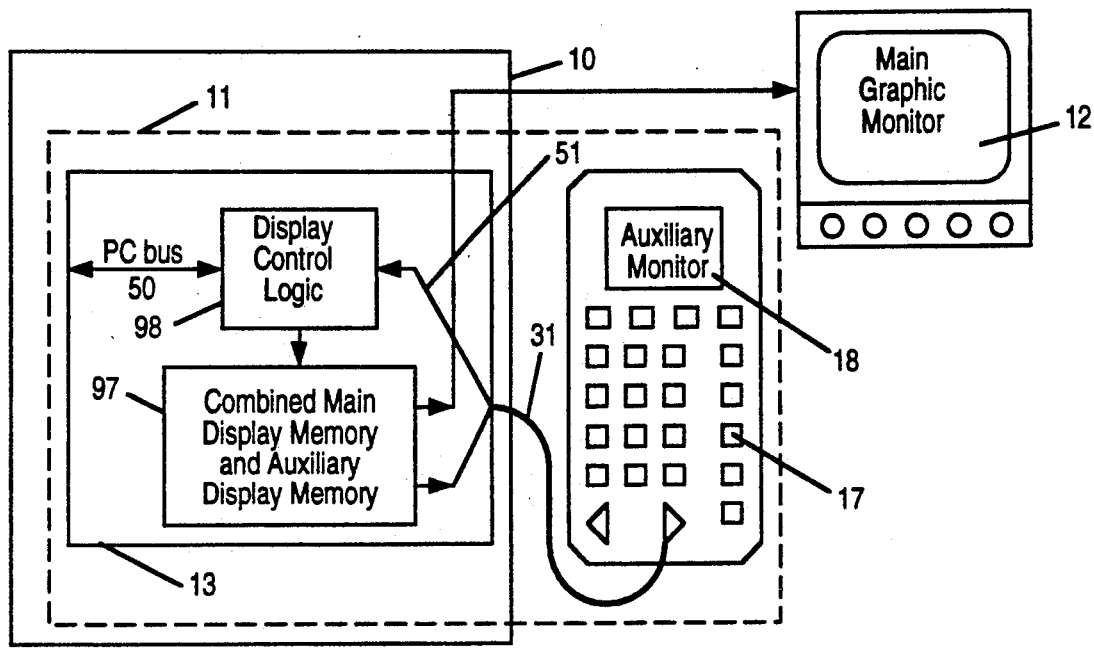
FIGS. 8(a-b) are block diagrams of two variations of the present invention as practiced in the first alternative embodiment of the present invention.
Figure 8B:
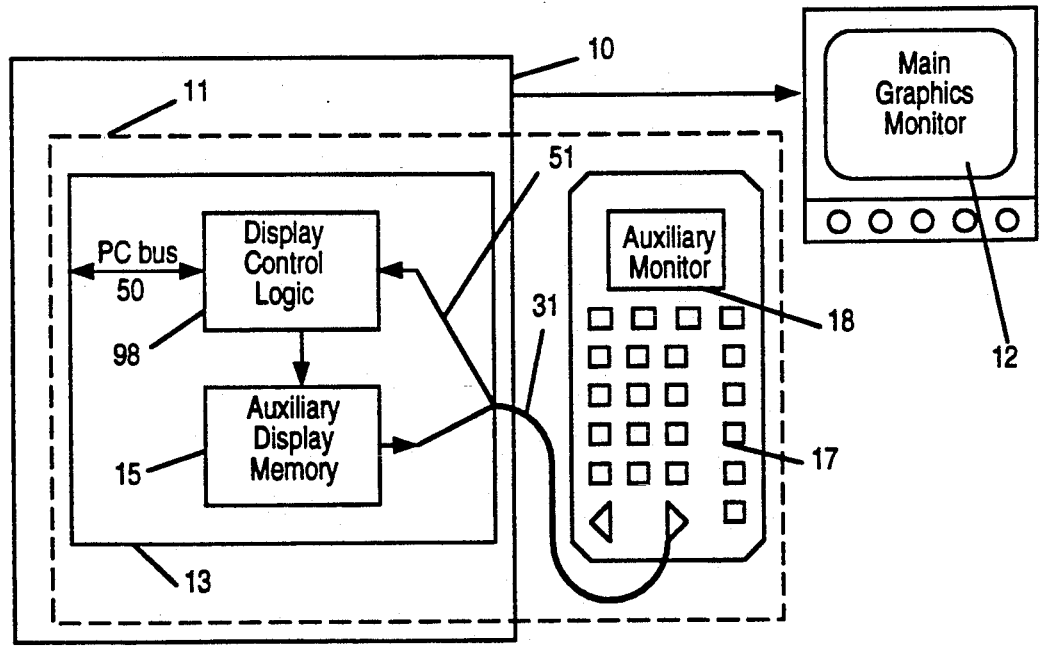

Referring to FIGS. 8a and 8b, an alternative implementations of the first alternative embodiment are illustrated. Within the scope of the first alternative embodiment, the microprocessor 14 may be replaced by display control logic device 98. Also, the adapter 13 may be housed within the generator means 10.

Alternatively, as illustrated in FIG. 8b, the auxiliary display memory 15 and the display control logic device 98 may be integrated with main display logic and memory, thus providing the output of the generator means 10 intended for the main graphics monitor 12. In this implementation, the generator means 10, housing the control adapter device 13, simultaneously provides output both for the main graphics monitor 12 and the auxiliary monitor 18 from the same or different parts of the combined main display memory and auxiliary display memory 97.

It should be realized that the two implementations of the first alternative embodiment and illustrated in FIGS. 8a and 8b are merely examples of variations of the present invention and in no way limit the scope of the present invention.

Typically, the operator controls the presentation being displayed on the main monitor 12 by means of a remote control device 17. By keying in commands to the generator means 10 via the remote control device 17, the operator can control the images or sequence of images displayed on the main monitor 12 as well as how quickly and how long the images are displayed.

Using the present invention, the operator, via the remote control device 17 and a control adapter device 13 has the ability to preview the image for the main monitor 12 on an auxiliary monitor 18 housed within the remote control device 17. In addition, to previewing the next image in a sequence, the operator has access to private notes concerning the presentation, previously stored within the generator means 10. The ability to access previously stored notes is beneficial to the operator, especially when the presentation to an audience is a combination of graphic images displayed on the main monitor 12 and an oral presentation by the operator. The operator may also view on the auxiliary monitor 18 a display of system control information not typically displayed on the main monitor 12.

The control of images on the auxiliary monitor 18 via a keypad on the remote control device 17 is similar to the control of the images displayed on the main monitor 12. The keypad output 51 is coupled to a microprocessor 14 within the control adapter device 13. When the operator wishes to view the next image or access private notes, a command signal is sent from the remote control device 17 to the microprocessor 14 and then to the generator means 10 via the processed command signal from the microprocessor 14. The desired images or notes are generated by generator means 10 and returned to the microprocessor 14 through a bi-directional interface 50. The microprocessor 14 converts the secondary signal 21 received from the generator means 10 into an image in an auxiliary display memory 15. The secondary image (secondary visual image) stored in the auxiliary display memory 15 is continuously outputted to the auxiliary monitor 18 through the remote control device 17.

Although the first alternative embodiment is the simplest example of practicing the present invention, it necessitates drawing graphical information separately into the generator means 10 display memory (not shown) and into the auxiliary display memory 15. The two display memories typically do not have the same display resolution so some display artifacts will typically be generated. Also, performance of the system may be slower due to the need to draw graphical information in both display memories. However, this embodiment is more generally applicable, as well as the easier method to implement into practice.

Figure 2:
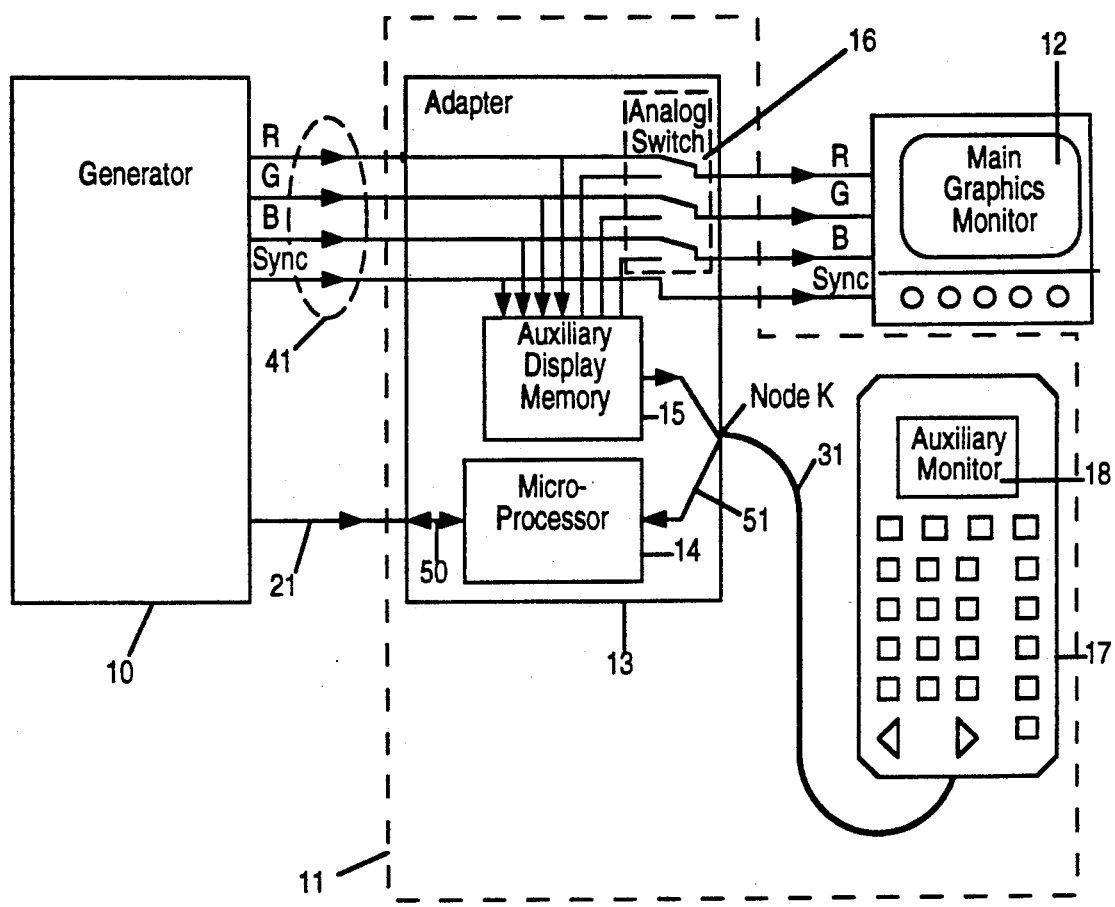
FIG. 2 is a block diagram of the present invention practiced in a second alternative embodiment.

FIG. 2 describes a second alternative embodiment. As in the first embodiment, described in FIG. 1, a graphics generator means 10 outputs a signal 41. In the second alternative embodiment, signal 41 is comprised of RGB and Sync signals. The output signal 41 is coupled to the input of analog switch 16 (switching means), as well as to the input of an auxiliary display memory 15. The output of the analog switch 16 is coupled to the input of a main monitor 12.

When the operator seeks to view an image on an auxiliary monitor 18, the request is sent to a microprocessor 14 via commands from a keypad located in the remote control device 17. The keypad in the second alternative embodiment is comprised of individual keypad buttons. However, any functionally equivalent input device such as a trackball would still be within the spirit and scope of the present invention.

After the microprocessor 14 receives instructions requesting an image for the auxiliary monitor 18, the microprocessor 14 sends a command signal to the generator means 10 to begin the process whereby the desired image is transferred to the auxiliary display memory 15.

The microprocessor 14 is coupled to the generator means 10 through a bi-directional interface 50. The bi-directional interface 50 can be, but is not limited to, a serial interface, such as an RS232 port, a PC bus or a parallel interface, such as a SCSI interface. Alternately, another type of bidirectional channel of the required bandwidth may be used, such as an infrared or radio frequency link.

The capture sequence employing means for capturing and storing used in the preferred embodiment (see FIG. 3) and the second alternative embodiment (see FIG. 2) for capturing and storing an image from the output signal 41 for the auxiliary monitor 18 is illustrated in FIGS. 6(a)–(e). The five steps shown typically take place within five successive video field times.

Typically, a first image being displayed on the main monitor 12 is stored in a first buffer storage device 301. The generator means 10 draws a second image for display on the auxiliary monitor in a second buffer storage device 302. Typically, the second image is different than the first image displayed on the main monitor 12. The generator means 10 must be able to switch the contents of the output signal 41 between the first buffer 301 and the second buffer 302 within a vertical blanking interval.

In the first step of the capture sequence, in reference to FIG. 6(a), a "capture image" command is received by the control adapter device 13. The output signal 41 of the first image sent from the first buffer storage device 301 is received by the main monitor 12. Whatever image currently stored in the frame buffer storage device 23 is displayed on the auxiliary monitor 18.

In the second and third steps, referring to FIGS. 6(b) and 6(c), the auxiliary monitor 18 is momentarily blanked while the frame buffer storage device 23 is loaded with the first image currently being sent to the main monitor 12. Once the first image is loaded into the frame buffer storage device 23, the control adapter device 13 is instructed to wait one field time, as shown in FIG. 6(c). The frame buffer storage device 23 now contains a copy of the image displayed on the main monitor 12. The auxiliary monitor remains blanked until the fifth step, illustrated in FIG. 6(e).

In the fourth step, as illustrated in FIG. 6(d), the control adapter device 13 captures the second image stored in the second buffer storage device 302 into the frame buffer storage device 23. Simultaneously, the first image, previously stored in the frame buffer storage device 23 is sent to the main monitor 12, via the analog switch 16 (switching means) shown in FIGS. 2 and 3. The switching means includes means for setting the analog switch 16 to provide a connection between the generator means 10 and the main monitor 12, or a connection between frame buffer storage device 23 and main monitor 12. This permits the loading of the frame buffer storage device 23 with a second image while giving the appearance of an uninterrupted first image on the main monitor 12.

Referring to FIG. 6(e), the generator means 10 returns to outputting the contents of the first buffer 301 to the main monitor 12. The frame buffer storage device 23 now contains a copy of the image in the second buffer 302 and the auxiliary monitor 18 is unblanked so that this copy is displayed on the auxiliary monitor 18. Also, a "capture complete" command is sent by the control adapter device 13 to the generator means 10.

If the operator wishes to view the same image being displayed on the main monitor 12 on the auxiliary monitor 18, the microprocessor 14 causes the RGB inputs to the auxiliary display memory 15 to pass directly to the auxiliary monitor 18. This is accomplished either by continuously capturing and displaying the contents of the frame buffer 23, as in FIG. 6(d), or, as in the preferred embodiment, with a second analog switch 99 (see FIG. 4).

The sequence of capturing an image from the output signal 41 is applicable to both the second alternative embodiment and to the preferred embodiment as described below in reference to FIGS. 3-5.

Figure 3:
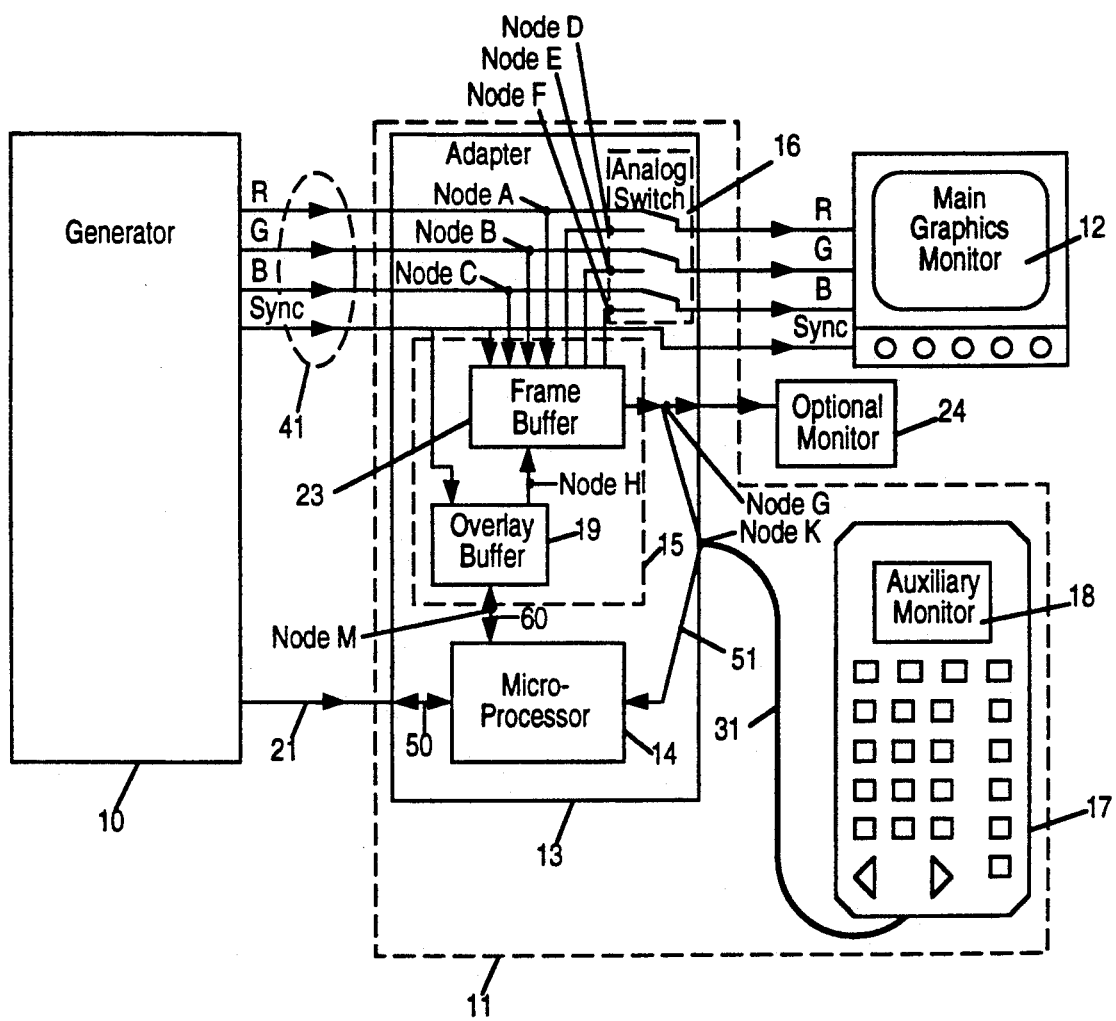
FIG. 3 is a block diagram of the present invention practiced in a preferred embodiment.

Referring to FIG. 3, a block diagram describing the preferred embodiment of the present invention is detailed. A graphics generator means 10 generates a primary RGB signal 41. The signal 41 is coupled to the input of a display control device 11. The display control device 11 provides an output signal identical to the RGB signal 41 which is coupled to the input of a main monitor 12.

The display control device 11 is comprised of control adapter device 13 and a remote control device 17. The control adapter device 13 is coupled to the generator means 10 via an interface that carries the primary RGB signal 41, as well as coupled to a bi-directional interface 50 that carries an auxiliary signal 21. The control adapter device 13 is also coupled via an interface 31 to the remote control device 17.

In a manner similar to the practice of the first and second alternative embodiments, the operator can control the images on the main monitor 12, as well as the images on the auxiliary monitor 18.

The operator keys in the instructions for the generator means 10 on the remote control device 17. The serially encoded keypad output, coupled at Node K is transmitted to the input of a microprocessor 14. The microprocessor 14 is coupled via a bi-directional interface 50 to the generator means 10 and to an auxiliary display memory 15 via a second biidirectional interface 60. The auxiliary display memory 15 is comprised of a frame buffer storage device 23 (see FIG. 4) and an overlay buffer storage device 19 (see FIG. 5). The frame buffer storage device 23 stores the image captured from the RGB signal 41. The image is captured at a point prior to the analog switch 16.

Additionally, the microprocessor 14, upon instructions from the operator through remote control device 17, can draw text or black and white graphics into the overlay buffer storage device 19. The text or the black and white graphics can then be used in combination with the RGB signal 41 received from the generator means 10. Thus, the practice of the invention according to the preferred embodiment incorporates features of both the first and second alternative embodiments. Some of the features include, graphical information, including text, written by the adapter microprocessor 14 into the overlay buffer 19 of the auxiliary display memory 15, also images for display on the auxiliary monitor 18 captured in the frame buffer 23 of the auxiliary display memory, using the capture sequence illustrated in FIG. 6.

Once an image requested by the operator is stored in the frame buffer storage device 23, it is continuously displayed on an auxiliary monitor 18 contained within the remote control device 17. Additionally, the requested image output, identified as Node G is NTSC encoded and displayed on an optional NTSC encoded monitor 24. The optional monitor 24 provides the operator with a larger screen than is available with the remote control device 17.

Figure 4:
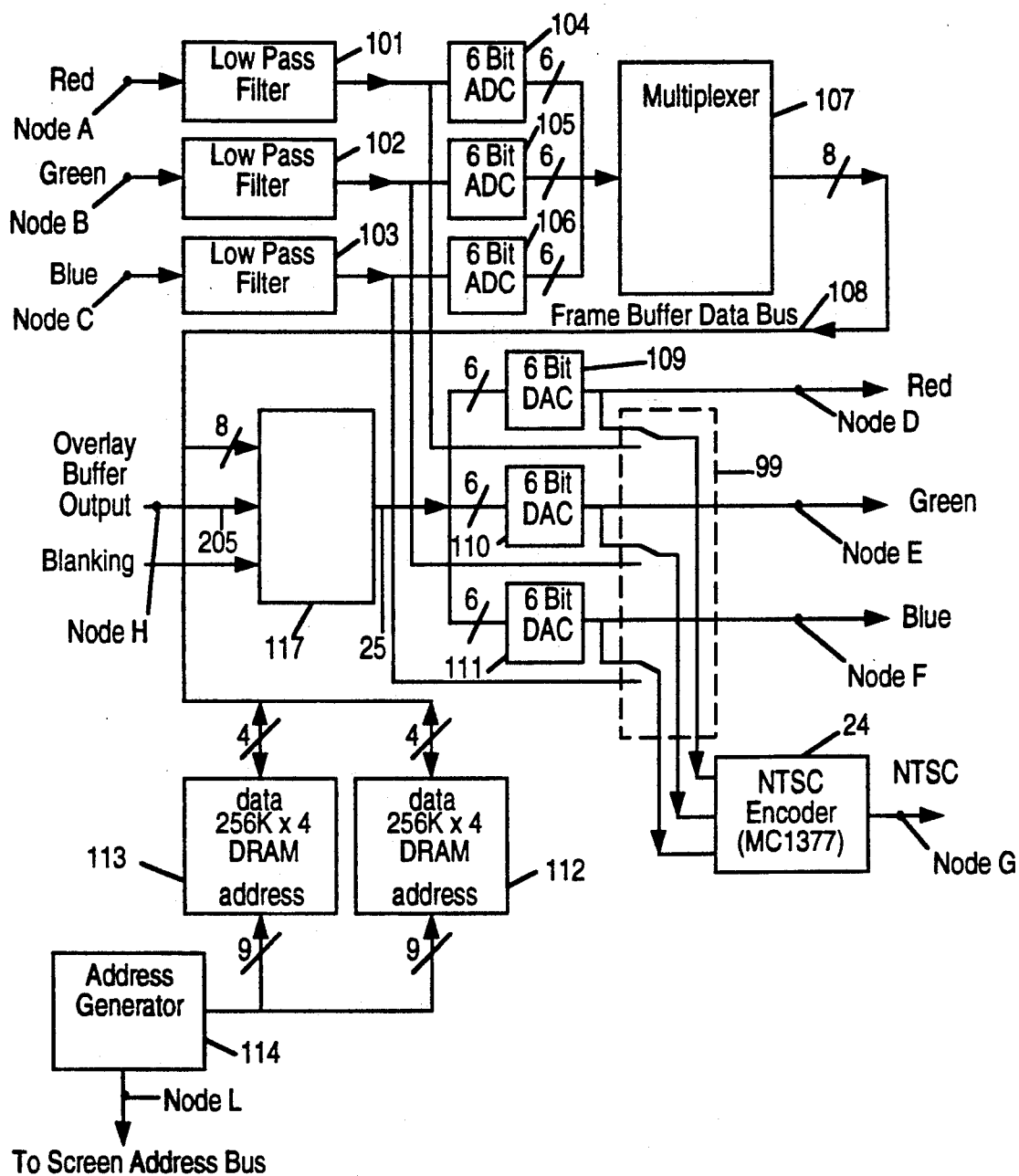
FIG. 4 is a block diagram of a frame buffer storage device from the preferred embodiment of the present invention.

FIG. 4 describes the frame buffer storage device 23 shown in FIG. 3. Additionally, the frame buffer storage device 23, as a component of the auxiliary display memory 15 of FIG. 3 could also function as the stand alone auxiliary display memory 15 of FIG. 2. However, this illustration, as well as all model numbers disclosed are merely examples and in no way should be construed to limit the practice of the present invention.

The frame buffer storage device 23 is comprised of three 6-bit A/D converters 104-106. Some converters are commonly available under a part designation Fujitsu MB40576. Three pole linear phase filters constructed of discrete passive capacitors and inductors are used as the three low-pass filters 101-103 for the color signals red (R), green (G) and blue (B). Two devices commonly available under a part designation 74F257 function as the multiplexer 107. The two 256K×4 DRAMs 112-113 are commonly available under a part designation Toshiba TC514256APL-80. The three digital-to-analog (D/A) converters 109-111 are constructed from discrete resistors. The RGB-to-NTSC encoder is a commonly available device. One such device is available under the part designation Motorola MC1377. The RGB signal is encoded to the American system of color telecasting designated by the National Television System Committee (NTSC) via the RGB-to-NTSC encoder 24. However, this encoding system simply provides a convenient way to transmit a color signal to the auxiliary monitor 18 in the remote control device 17 and should in no way be construed to limit the practice of the present invention.

The primary RGB signal 41 is received as analog inputs from the generator means 10 and is coupled to the input of the display control device 11. The RGB signals are coupled to the frame buffer storage device 23 at Nodes A, B, and C, respectively. The RGB signals are then passed through their respective low-pass filters 101–103. The filtered output is coupled to the input of the three A/D converters 104–106. The output of three A/D converters 104–106 is coupled to a multiplexer 107 that selects 16 bits from the 18 bits output by the A/D converters 104–106 and multiplexes the output to 8 bits to a data bus 108 of two 256K×4 DRAMs 112–113.

The data in successive addresses of the two 256K by 4 bit DRAMs 112–113 that form the display memory are continuously read, during unblanked display time, to the D/A converters 109–111 to generate the RGB output signal 25 to a logic block 117 (in this case, formed by three PAL16L8s). Typically, green is encoded in 6 bits while red and blue are encoded in 5 bits each. However, other combinations of RGB bits could be used. For each display pixel the DRAMs 112–113 are read twice, in fast page mode, to provide the required 16 bits.

In an alternative mode of operation that provides for higher luminance resolution, the RGB signal is encoded in 4 bits each and the G signal is sampled at a rate of 512 samples per horizontal scan which is twice the rate for R and B, which are only sampled at 256.

When the control adapter device 13 stores an image, the digitized RGB is multiplexed onto the 8-bit data bus 108 of the two DRAMs 112–113 and is written, in two fast page mode cycles, into successive DRAM addresses. This writing is interleaved with reading of data so that the output of the frame buffer storage device 23 is not interrupted. The writing of data to a given location in the display memory is delayed by several pixel times from the read of that location in order to accommodate the delays of the input filters 101–103, of A/D converters 104–106 and of D/A converters 109–111. This delay allows the output of the frame buffer storage device 23 to align with the main output signal 41 from the generator means 10.

The RGB output of the frame buffer storage device 23 is then converted to an NTSC encoded signal via an NTSC encoder 24 to provide an output signal for the auxiliary monitor 18. During image storage in the auxiliary display memory 15, the RGB output of the frame buffer storage device 23 is switched, via the analog switch 16 to the main graphics monitor 12 in place of the main output signal 41 (see FIG. 6d).

Figure 5:
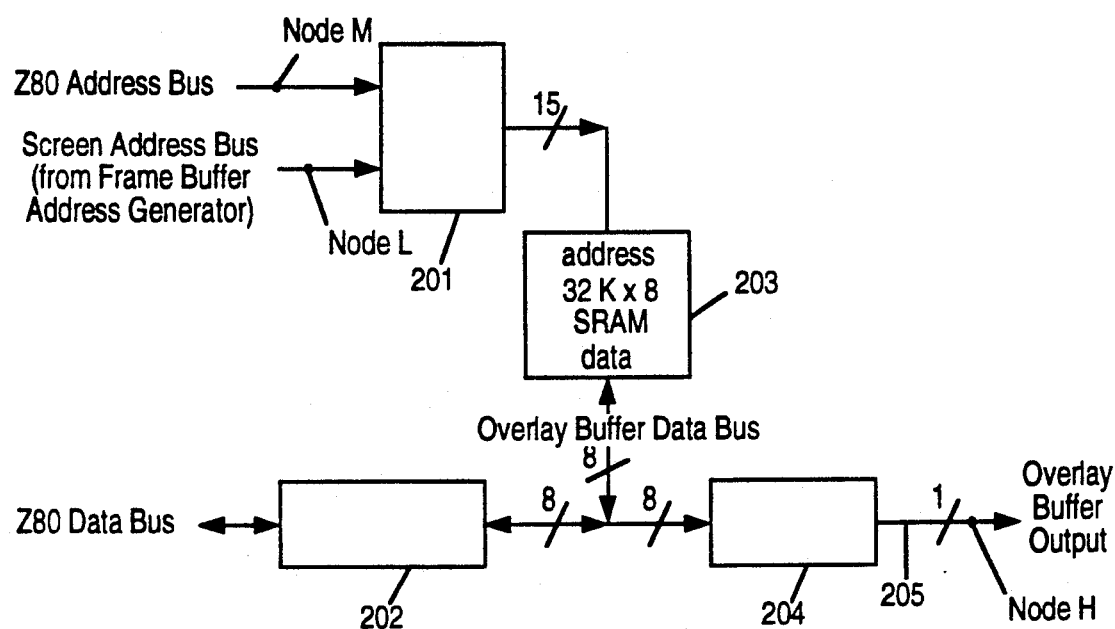
FIG. 5 is a block diagram of an overlay buffer storage device from the preferred embodiment of the present invention.

FIG. 5 illustrates the overlay buffer storage device 19 as shown in FIG. 3. Additionally, the overlay buffer storage device 19, as a component of the auxiliary display memory 15 of FIG. 3 could also function as the stand alone auxiliary display memory 15 of FIG. 1. However, this is merely used as an example and should in no way be construed to limit the practice of the present invention.

The overlay buffer storage device 19 is a second display memory device. In the preferred embodiment, the overlay buffer 19 is a 1-bit-per-pixel bit-mapped display buffer used to display text and graphics overlaid on the output of the frame buffer storage device 23.

The horizontal resolution of the overlay buffer storage device 19 is 512 pixels. The display control device 11 can display either the contents of the frame buffer storage device 23, or the contents of the overlay buffer storage device 19, or the contents of both on the auxiliary monitor 18. When the overlay buffer storage device 19 and the frame buffer storage device 23 are both being displayed, the frame buffer signal is reduced in intensity to enhance visibility of the overlay information displayed on the auxiliary monitor 18. However, this is merely used as an example and should in no way be construed to limit the practice of the present invention.

The microprocessor 14 coordinate the storage of the images in the frame buffer storage device 23 and, concurrently, communicates with the generator means 10, via a bi-directional interface 50, allowing commands to pass from the remote control device 17 to the generator means 10. The microprocessor 14 also controls the main output signal 41 sent to the main monitor 12. The microprocessor 14 receives and interprets the commands received from the remote control device 17. Additionally, the microprocessor 14 writes all text and graphics to the overlay buffer storage device 19.

In the overlay buffer device 19, the microprocessor 14 and the address generator 114 (see FIG. 4) address an SRAM 203 via a pair of address buses, identified Nodes M and L, respectively. The SRAM multiplexer 201 multiplexes these buses to drive the address bus of a 32K ×8 SRAM 203. Such an SRAM is commonly available under a part designation Fujitsu MB84256A-10. When the multiplexer 201, comprised of four 74F158's, passes the addresses from the microprocessor 14 to the SRAM 203, the microprocessor 14 exchanges data with the SRAM 203 via a bi-directional buffer device 202 which in the preferred embodiment is comprised of a 74LS373 and a 74LS244. When the multiplexer 201 passes the addresses from the frame buffer address generator 114 to the SRAM 203, the SRAM data is loaded into an 8-bit shift register 204. Such a shift register is commonly available under a part designation 74HCT166. The output 205 of the 8-bit shift register 204 is coupled at Node H to the input of a logic block 117 which combines the output of frame buffer DRAMs 112–113 and the output 205 of the overlay buffer (see FIG. 4).

Using the designs described in FIG. 3–5 and 7, the preferred embodiment of the present invention can be practiced according to the sequence described in reference to FIGS. 6(a)–(e). Although a preferred embodiment is described in which to practice the present invention, it should not be construed to limit the practice of the present invention.

Thus, a hand-held remote control device providing a auxiliary monitor for private viewing by the operator is described.

We claim:
1. A computer display system for displaying visual images comprising:
   image generation means for generating visual images;
   display control logic means coupled to said image generation means for controlling images being displayed by said computer display system;
   storage means coupled to said display control logic means for storing said visual images generated by said image generation means, said storage means having a first portion for storing a first visual image of said visual images, said storage means having a second portion for storing a second visual image of said visual images, said first visual image being different from said second visual image;

overlay storage means coupled to said display control logic means for storing an overlay image;

hand-held remote control means coupled to said display control logic means and said storage means for selecting for display said visual images generated by said image generation means;

primary display means coupled to said image generation means for displaying primary visual images generated by said image generation means; and secondary display means located on said remote control means for displaying secondary visual images, said secondary display means for previewing visual images displayed on said primary display means, said hand-held remote control means further including means for selecting said first visual image for display on said primary display means concurrently with the display of said second visual image on said secondary display means, said hand-held remote control means further including means for selecting said overlay image for display on said secondary display means concurrently with the display of said visual images on said secondary display means.

2. The computer display system as claimed in claim 1 wherein said visual images displayed on said secondary display means include graphical, textual, or numerical images and any combination thereof.

3. The computer display system as claimed in claim 1 wherein said primary visual images are different than said secondary visual images.

4. The computer display system as claimed in claim 1 wherein said primary visual images are substantially similar to said secondary visual images.

5. The computer display system claimed in claim 1 further including:

means for receiving a command signal sent from said remote control device;

means for generating a secondary signal associated with said command received from said remote control device.

6. In a computer display system having an image generation means for generating visual images, display control logic means coupled to said image generation means for controlling images being displayed by said computer display system, storage means coupled to said display control logic means for storing said visual images generated by said image generation means, said storage means having a first portion for storing a first visual image of said visual images, said storage means having a second portion for storing a second visual image of said visual images, said first visual image being different from said second visual image, overlay storage means coupled to said display control logic means for storing an overlay image, hand-held remote control means coupled to said display control logic means and said storage means for selecting for display said visual images generated by said image generation means, primary display means coupled to said image generation means for displaying primary visual images generated by said image generation means, and secondary display means located on said remote control means for displaying secondary visual images, a method for controlling said computer display system comprising the steps of:

selecting a visual image for display on said secondary display means, said visual image being selected using said remote control device;

selecting said first visual image for display on said primary display means concurrently with the display of said second visual image on said secondary display means;

selecting said overlay image for display on said secondary display means concurrently with the display of said visual images on said secondary display means;

processing said visual image selected for display on said secondary display means, said visual image being processed using said image generation means and said display control logic means;

storing said visual image selected for display in said storage means; and previewing said visual image stored in said storage means on said secondary display means, displaying said visual image on said primary display means.

7. The method as claimed in claim 6 wherein said visual images displayed on said secondary display means include graphical, textual, or numerical images and any combination thereof.

8. The method as claimed in claim 6 wherein said primary visual images are different than said secondary visual images.

9. The method as claimed in claim 6 wherein said primary visual images are substantially similar to said secondary visual images.

10. The method claimed in claim 6 further including the steps of:

receiving a command signal sent from said remote control device;

generating a secondary signal associated with said command received from said remote control device.

* * * * *